(12) United States Patent
Army, Jr. et al.

(10) Patent No.: US 9,897,093 B2
(45) Date of Patent: Feb. 20, 2018

(54) BEARING COOLING FLOW AND ENERGY RECOVERY SYSTEMS

(71) Applicant: Hamilton Sundstrand Corporation, Windsor Locks, CT (US)

(72) Inventors: Donald E. Army, Jr., Enfield, CT (US); Harold W. Hipsky, Willington, CT (US); Christopher McAuliffe, Windsor, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 292 days.

(21) Appl. No.: 14/668,016

(22) Filed: Mar. 25, 2015

(65) Prior Publication Data

US 2016/0281721 A1    Sep. 29, 2016

(51) Int. Cl.
| | |
|---|---|
| *B64D 13/06* | (2006.01) |
| *F04D 17/16* | (2006.01) |
| *F04D 25/02* | (2006.01) |
| *F16C 37/00* | (2006.01) |
| *F04D 29/58* | (2006.01) |
| *F24F 5/00* | (2006.01) |

(52) U.S. Cl.
CPC .......... *F04D 17/16* (2013.01); *F04D 25/024* (2013.01); *F04D 29/5806* (2013.01); *F16C 37/00* (2013.01); *F24F 5/0085* (2013.01)

(58) Field of Classification Search
CPC ...... F04D 29/5806; F04D 29/58; F16C 37/00; F24F 5/0085; B64D 2013/0648; B64D 13/06
See application file for complete search history.

(56) References Cited

U.S. PATENT DOCUMENTS

| | | | | |
|---|---|---|---|---|
| 5,059,093 A | * | 10/1991 | Khalid | F01D 17/105 415/115 |
| 5,309,735 A | * | 5/1994 | Maher, Jr. | B64D 13/00 417/406 |
| 8,496,533 B2 | * | 7/2013 | Beers | B64D 13/06 384/321 |
| 2011/0229351 A1 | | 9/2011 | Beers et al. | |

FOREIGN PATENT DOCUMENTS

| | | |
|---|---|---|
| DE | 102009002416 A1 | 10/2010 |
| EP | 3020637 | 5/2016 |

OTHER PUBLICATIONS

European Search Report, Application No./Patent No. 16161696.6-1607, dated Jul. 26, 2016, European Patent Office: European Search Report 6 pages.

* cited by examiner

*Primary Examiner* — Woody Lee, Jr.
*Assistant Examiner* — Sabbir Hasan
(74) *Attorney, Agent, or Firm* — Cantor Colburn LLP

(57) ABSTRACT

An air cycle machine is provided. The machine includes a housing configured to enable airflow therethrough, a fan disposed within the housing and configured to rotate within the housing, and at least one aperture formed in the housing and configured to allow airflow through the at least one aperture from a cooling airflow path of an air cycle machine and into the housing. The at least one aperture is configured to optimally direct airflow passing therethrough toward the fan.

13 Claims, 5 Drawing Sheets

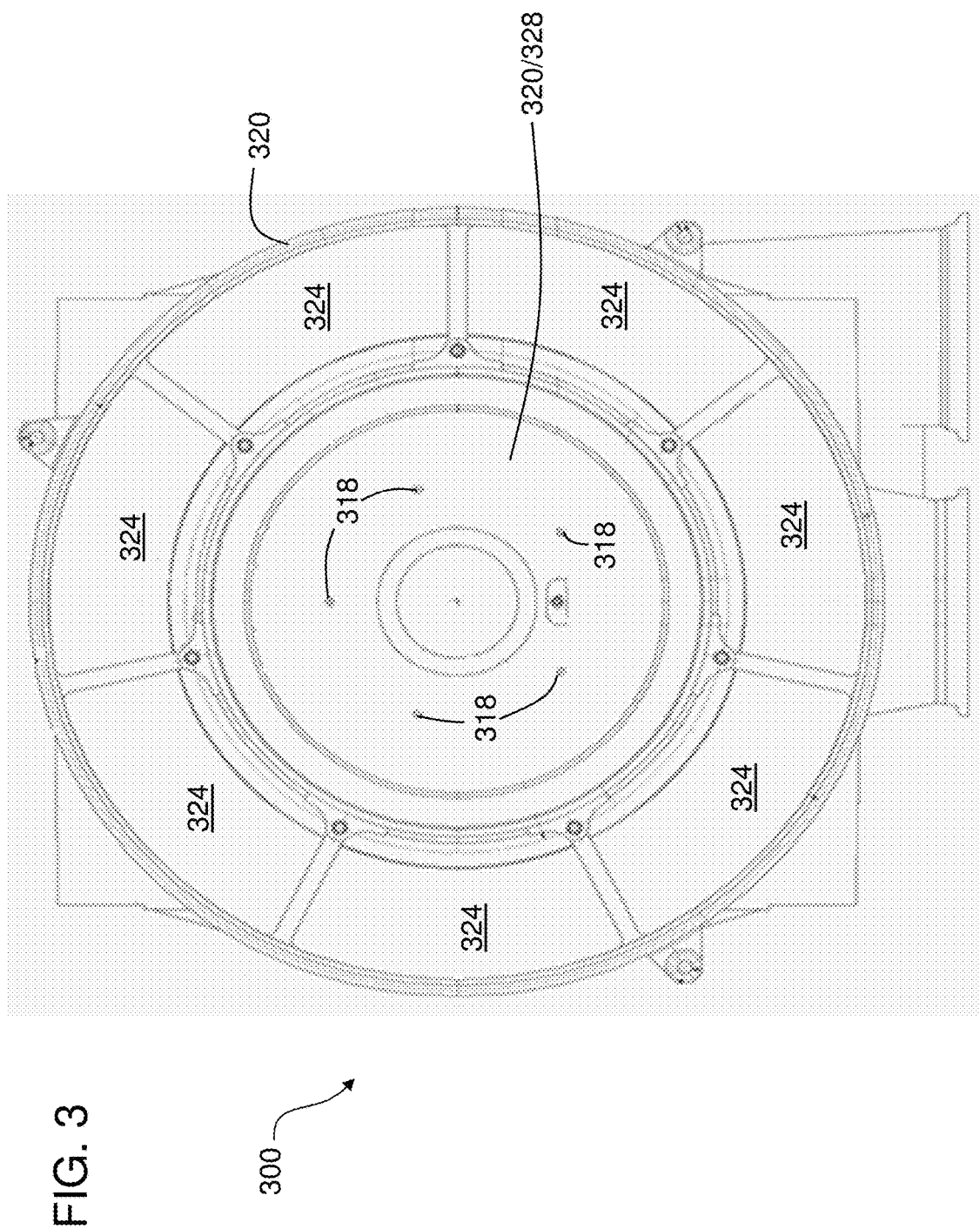

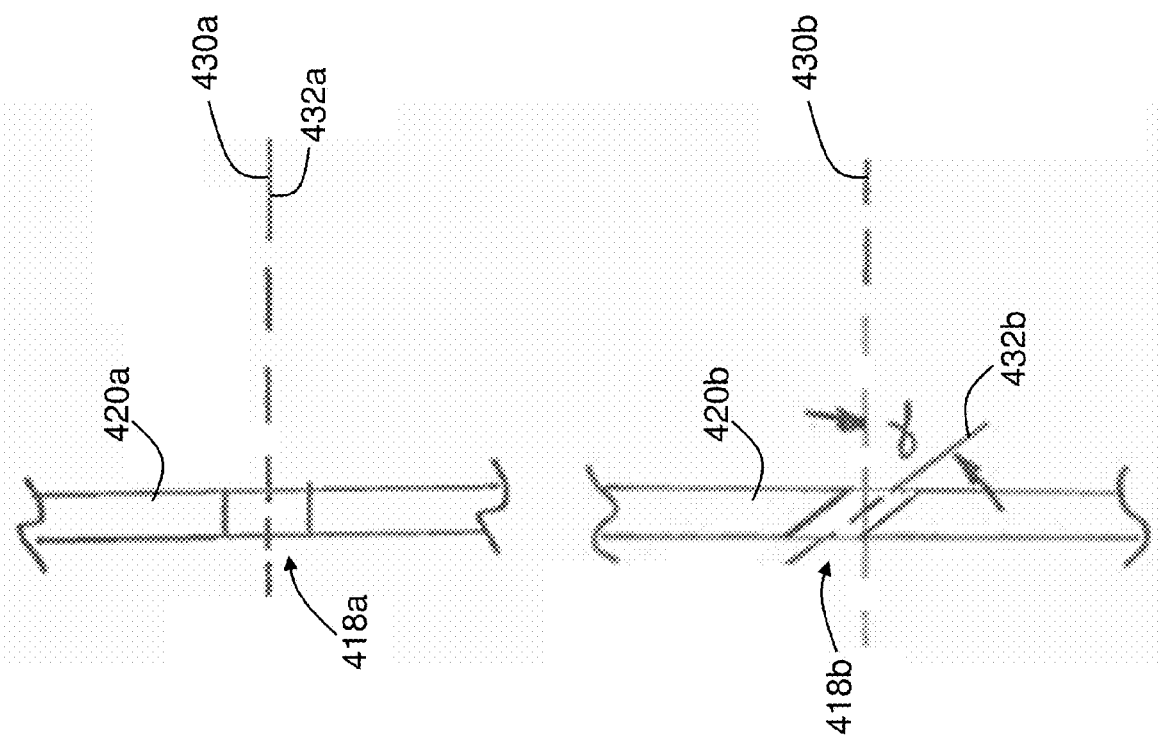

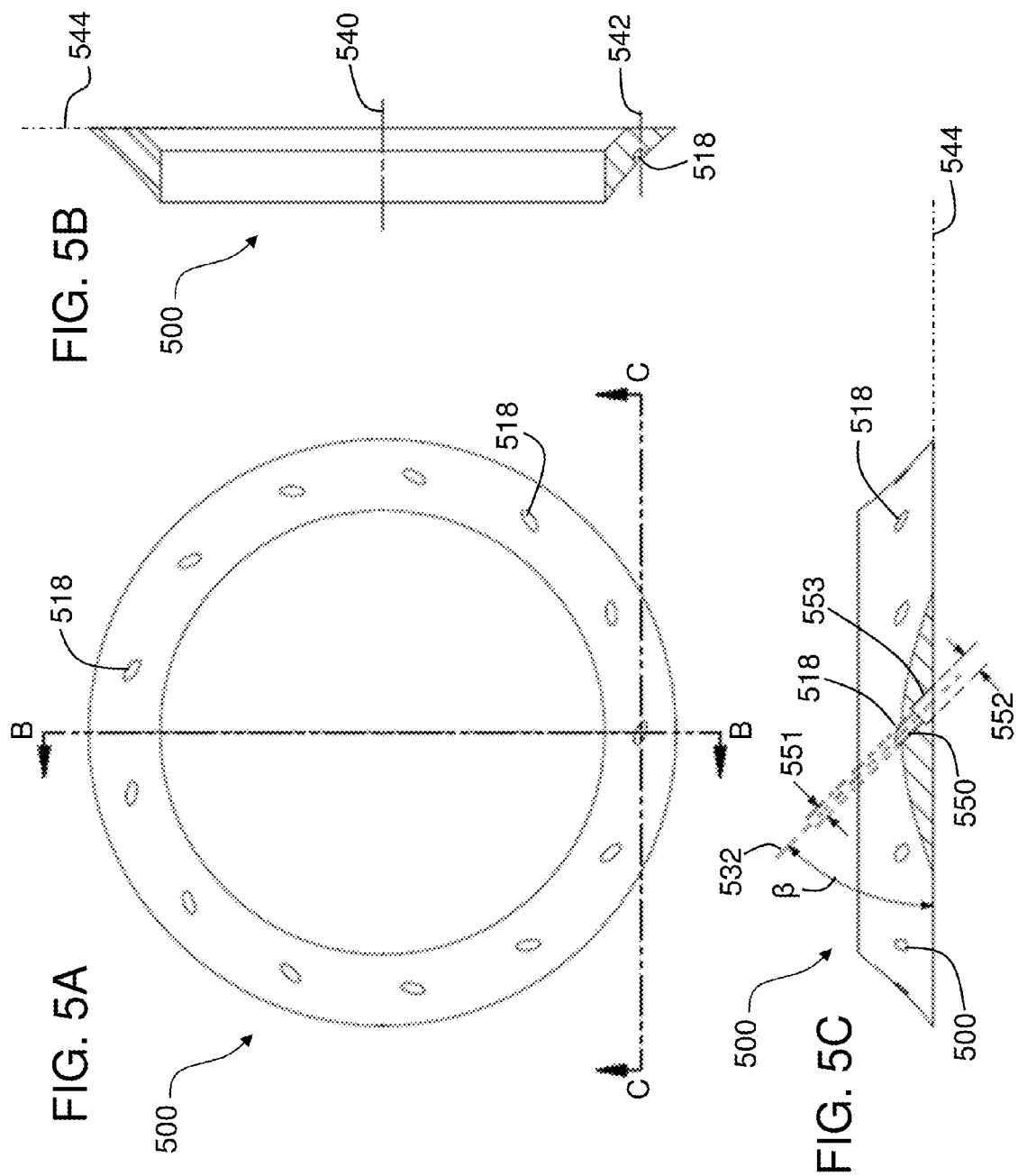

BEARING COOLING FLOW AND ENERGY RECOVERY SYSTEMS

BACKGROUND OF THE INVENTION

Embodiments of the invention are directed to environmental control system bearing cooling flows and more particularly to energy recovery and efficiency of bearing cooling flows in environmental control systems.

Conventional aircraft environmental control systems incorporate an air cycle machine, also referred to as an air cycle cooling machine, for use in cooling and dehumidifying air for an aircraft cabin. Such air cycle machines may include two or more wheels disposed at axially spaced intervals along a common shaft. The wheels are part of, for example, a compressor rotor, a turbine rotor, a fan rotor, an additional turbine rotor, or an additional compressor rotor. In some cases the turbine or turbines drive both the compressor and the fan.

On aircraft powered by turbine engines, the air to be conditioned in the air cycle machine is typically compressed air bled from one or more compressor stages of the turbine engine. In conventional systems, this bleed air passes through the air cycle machine compressor where it is further compressed. The compressed air is passed through a heat exchanger to cool the compressed air sufficiently to remove moisture and dehumidify the air. The dehumidified compressed air is expanded in the turbine of the air cycle machine to both extract energy from the compressed air so as to drive the shaft and also to cool the expanded turbine exhaust air before it is supplied to the aircraft cabin as conditioned cooling air.

The air cycle machine may include one or more bearings. During operation, the bearings will heat up, and thus a cooling flow is passed through the air cycle machine that cools the bearings. This cooling air may be bleed air from one of the environmental control system heat exchangers. After passing through the air cycle machine, the bearing cooling air is passed or dumped into a RAM circuit that includes a fan.

BRIEF DESCRIPTION OF THE INVENTION

According to one embodiment an air cycle machine is provided. The air cycle machine includes a housing configured to enable airflow therethrough, a fan disposed within the housing and configured to rotate within the housing, and at least one aperture formed in the housing and configured to allow airflow through the at least one aperture from a cooling airflow path of an air cycle machine and into the housing. The at least one aperture is configured to optimally direct airflow passing therethrough toward the fan.

According to another embodiment, a method of manufacturing an air cycle machine is provided. The method includes providing a housing configured to house a fan; installing a fan within the housing, wherein the fan is configured to rotate within the housing; and forming at least one aperture in the housing, the formed at least one aperture configured to allow airflow through the at least one aperture from a cooling airflow path of an air cycle machine and into the housing. The at least one aperture is configured to optimally direct airflow passing therethrough toward the fan.

Technical effects of embodiments of the invention include directing bearing cooling flow or exhaust flow through a plurality of apertures toward fan blades in an air cycle machine. Further, technical effects include providing optimized position, quantity, size, and angle of the apertures to augment air cycle machine rotation, thereby reducing the total energy required by the system. That is, embodiments of the invention provide energy recovery and improved efficiency of air cycle machines.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

FIG. 3 is an end-view of an air cycle machine in accordance with an exemplary embodiment of the invention;

FIG. 4A is a cross-sectional view of a traditional air flow aperture;

FIG. 4B is a cross-section view of an air flow aperture in accordance with an exemplary embodiment of the invention;

FIG. 5A is a top view of a ring in accordance with an exemplary embodiment of the invention;

FIG. 5B is a cross-sectional view of the ring of FIG. 5A along the line B-B; and FIG. 5C is a cross-sectional view of the ring of FIG. 5A along the line C-C.

DETAILED DESCRIPTION OF THE INVENTION

Figure 1:
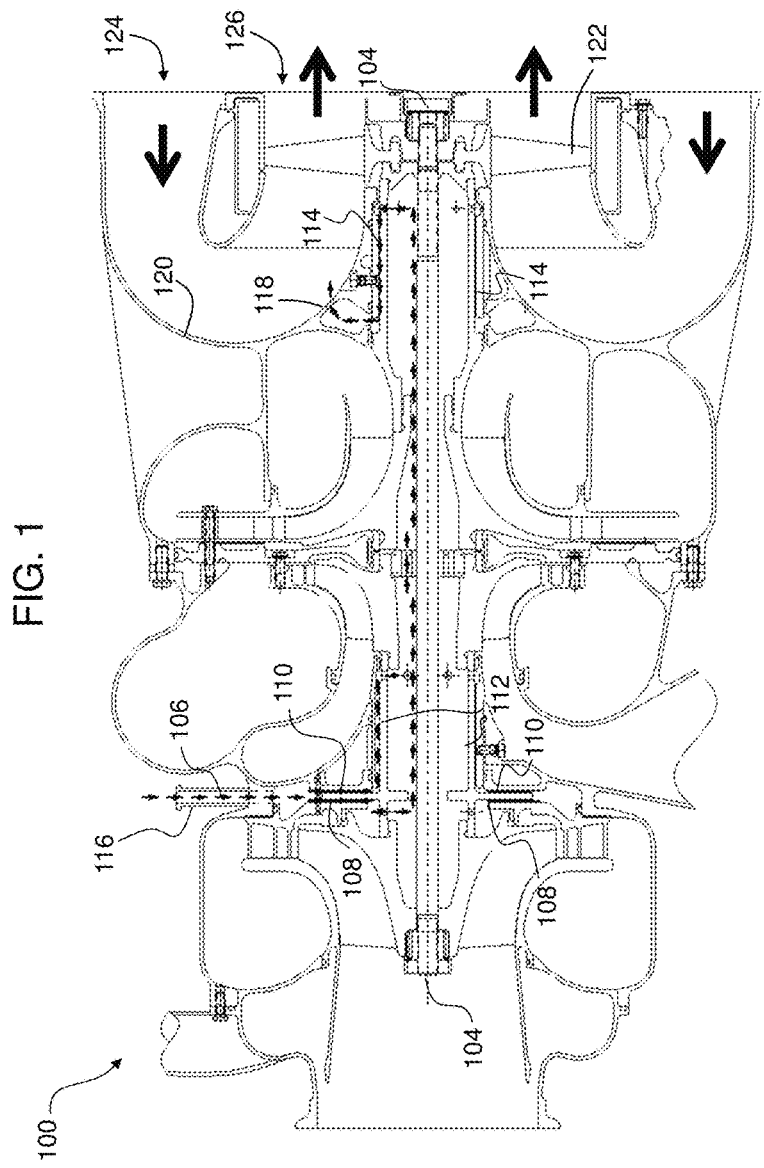
FIG. 1 is a schematic cross-sectional view of an air cycle machine.

FIG. 1 illustrates an air cycle machine 100 is part of an environmental control system that is configured to supply conditioned air, for example, to a cabin of an aircraft. The air cycle machine 100 of FIG. 1 is a four-wheel air cycle machine, with four rotors on a single shaft 104. The four rotors are fixed together and are supported by hydrodynamic bearing elements. There are, thus, four bearings configured within the air cycle machine 100 which are arranged along an airflow passage 106 that is represented by the path of arrows in FIG. 1. The air flow passage 106 provides air as both a lubricating fluid for the hydrodynamic bearings and as a cooling air flow to remove heat generated by the bearings during operation. Although described herein as a four-wheel air cycle machine, this is presented for illustrative and explanatory purposes, and other air cycle machines or other device/configurations may be used without departing from the scope of the invention, such as, for example, three-wheel air cycle machines.

In the exemplary configuration of FIG. 1, two of the four bearings are thrust bearings and two are journal bearings. The thrust bearings are located at the inlet side of the airflow passage 106 and the journal bearings are located further downstream in the airflow passage 106. A first thrust bearing 108 is configured as an outboard thrust bearing and a second thrust bearing 110 is configured as an inboard thrust bearing. After the thrust bearings 108 and 110, in the direction of the airflow passage 106, a first journal bearing 112 is configured as a turbine journal bearing and then, toward the outlet of the airflow passage 106 through aperture 118, a second journal bearing 114 is configured as a fan journal bearing. The thrust bearings 108, 110 are configured to operate with axial loads, and the journal bearings 112, 114 are configured to operate with radial loads within the air cycle machine 100.

During operation, each of the bearings 108, 110, 112, 114 will generate heat due to viscous shear of the hydrodynamically generated film of air between a bearing top foil and the rotating shaft. To dissipate the heat, air flows through airflow passage 106 and passes over the bearings 108, 110, 112, 114 to provide a cooling factor through and/or over the bearings 108, 110, 112, 114. The supply of cooling air impacts the efficiency of the entire system, such as the power and efficiency of an aircraft. Thus, providing an efficient supply, both in terms of air temperature/pressure and demands on the system, is beneficial, and in not wasting such energy.

The cooling air in airflow passage 106 is supplied from a cooling air inlet 116. The cooling air inlet 116 may be fluidly connected to an air supply source, which may be a single, high pressure, cool temperature source (not shown). For example, bearing cooling air may be bleed air from one of the environmental control system heat exchangers. After entering at inlet 116, the cooling air passes through the air cycle machine 100 through airflow passage 106 and exits the airflow passage 106 at one or more apertures 118. The apertures 118 may be apertures that are formed or pass through a housing 120 for a fan 122, such as a fan of a compressor. Thus, the housing 120 may define, in part by means of apertures 118, an airflow path for the fan 122. In addition to the air from the airflow path 106, a larger volume of air enters the housing 120 at inlet 124. The air in the housing 120 that interacts with the fan 122 is thus supplied primarily by inlet 124 with a portion passing into the housing 120 through the apertures 118. The combined air then exits the housing 120 at outlet 126. In some embodiments the aperture air may comprise about three percent of the total combined air that interacts with the fan 122. However, harnessing the energy of this air can improve the efficiency of the system.

Figure 2:
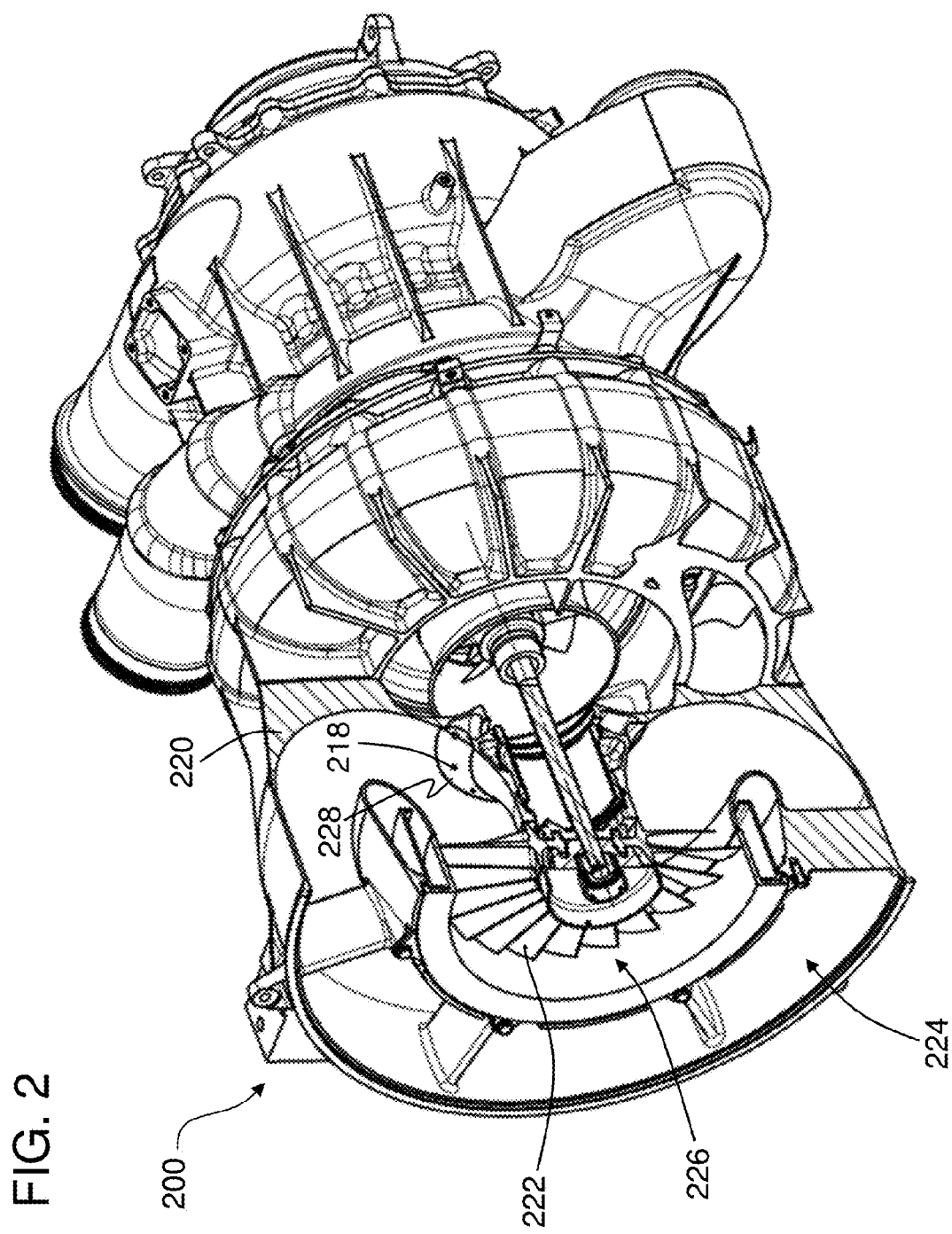
FIG. 2 is an isometric view of an air cycle machine in accordance with an exemplary embodiment of the invention.

Turning now to FIG. 2, an air cycle machine 200 in accordance with an exemplary embodiment of the invention shown. Air cycle machine 200 is substantially similar to air cycle machine 100 of FIG. 1, and thus like features are labeled with the same reference numerals, except preceded by a "2" instead of a "1." As shown in FIG. 2, the air cycle machine 200 includes a fan 222 that is within a housing 220. Air enters the housing 220 at inlet 224 and apertures 218 and exits the housing 220, after passing the fan 222, at outlet 226.

The apertures 218, as described above, provide or supply airflow that is used to cool bearings of the air cycle machine through the apertures 218 and into the housing 220 where the air will then pass the fan 222. Traditionally, the apertures are formed or machined either with an axis that is perpendicular to the surface of the housing (see, e.g., FIG. 4A, aperture 418a) or with an axis that is parallel to an axis of the air cycle machine (see, e.g., FIG. 1, aperture 118). However, in accordance with embodiments of the invention, the apertures 218 are formed at an angle with respect to normal to the surface of the housing 220, and thus may be optimized for directing the airflow from the cooling process flow path (see airflow passage 106 in FIG. 1) toward the fan 222, and thus recover the energy from the bearing cooling process and increase system efficiency.

As shown, the apertures 218 are formed within a portion of the housing, and particular, in the embodiment of FIG. 2, within a ring 228. The ring 228 may form a nozzle that is configured to direct airflow by means of the apertures 218. During construction of the air cycle machine 200, the ring 228 may be installed into the housing 220. In some alternative embodiments, the ring 228 may be formed integrally with the housing 220, or in other alternative embodiments, the ring 228 may be omitted, and the apertures may be formed directly into and through the housing 220. For the purpose of explanation and illustration, the ring 228 is presented, as further described below with respect to FIGS. 5A-5C. However, all discussion with respect to the apertures applies equally, regardless of the particular embodiment of configuration of the ring or lack thereof The apertures may be formed by machining, drilling, casting, and/or by other means known in the art.

Turning now to FIG. 3, an end-on view of an air cycle machine 300 in accordance with an exemplary embodiment of the invention is shown. Air cycle machine 300 is substantially similar to air cycle machines 100 and 200 of FIGS. 1 and 2, respectively, and thus like features are labeled with the same reference numeral, except preceded by a "3" instead of a "1" or a "2."

In the embodiment shown in FIG. 3, the ring 328 is formed integral with the housing 320, as shown. In this view, the inlet 324 is shown along with a surface of the housing 320 and ring 328. The apertures 318 are formed as holes passing through a surface of the housing 320. As shown in FIG. 3, there are five apertures 318. Those of skill in the art will appreciate that any number of apertures 318 may be formed in the housing 320 and/or ring 328, without departing from the scope of the invention.

Turning now to FIGS. 4A and 4B, a comparison between a traditional configuration (4A) and an exemplary embodiment of the invention (4B) is shown. In FIG. 4A a wall of a housing 420a is shown. The housing 420a may be similar to the housing described above, wherein one or more apertures 418a may pass therethrough, allowing for air to pass from one side (bearing cooling side) to another side (fan side). An exemplary aperture 418a is shown with an aperture axis 432a defined by a central axis of the aperture 418a. Also shown is a normal line 430a that is perpendicular or normal to the housing 420a. In this configuration, the aperture axis 432a is parallel with the normal line 430a.

In FIG. 4B, showing an exemplary embodiment of the invention, the aperture axis 432b of the aperture 418b is not parallel to the normal line 430b as it passes through the housing 420b. The aperture axis 432b is skew from the normal line 430b by an angle α. By configuring the aperture axis 432b of the aperture 418b at the angle α, the air flow that passes through the aperture 418b may be optimized for impacting the fan that is inside the housing (such as shown in FIGS. 1-3). A plurality of apertures 418b may be formed at angle α, thus optimizing the amount of directed airflow that impacts the fan in the compressor.

Turning now to FIGS. 5A-5C, an exemplary ring 500 is shown. FIG. 5A is a top view of a ring 500 in accordance with an exemplary embodiment of the invention; FIG. 5B is a cross-sectional view of the ring 500 along the line B-B of FIG. 5A; and FIG. 5C is a cross-sectional view of the ring 500 along the line C-C of FIG. 5A. The ring 500 may be substantially similar to the ring 228 of FIG. 2, and may form part of the housing, as described above. In alternative embodiments, the ring 500 may be a sub-part, part of, or integrally formed with the housing. In some embodiments, the ring is omitted and the apertures are formed directly in the housing (e.g., as shown in FIG. 1).

As shown in FIG. 5A, a plurality of apertures 518 are formed through the ring 500. The apertures 518 are configured to optimize the airflow through the holes in a direction out of the page of FIG. 5. As will be appreciated by those of skill in the art, the number of apertures 518 may be altered without departing from the scope of the invention.

With reference to FIG. 5B, the cross-sectional view shows that the aperture 518 does not pass through the ring 500 normal to the surface of the ring, but rather at an angle, such that only a portion of the aperture 518 is shown in the cross-section of FIG. 5B. An axis 540 represents a central axis of the ring 500 and in some embodiments represents the axis of a machine in which the ring 500 is installed. As shown, a line 542 is parallel to the central axis 540. This is shown to indicate that the apertures 518 are not configured parallel to the axis of the machine, as is the case in some traditional configurations (e.g., as shown in FIG. 1). Similar to FIG. 4B, the apertures 518 are skew, and configured to optimize the airflow into the housing such that the airflow impacts a fan with a housing in an efficient manner.

With reference to FIG. 5C, a partial cross-sectional view of the ring 500 is shown. In this view, the angle β is shown. Angle β is the angle of skew of the aperture 518 with respect to a plane 544 defined by a portion of the ring 500. Specifically, the plane 544 is a plane that is defined by a plurality of radii extending from the central axis 540. As will be understood by those of skill in the art, with respect to FIG. 5A, that the plane 544 is parallel to the page or paper of the figure.

As shown in the exemplary embodiment of FIGS. 5A-5C, and specifically shown in FIG. 5C, the aperture 518 may have a variable configuration. The aperture 518, of FIGS. 5A-5C, has a first portion 550 and a second portion 552, wherein each portion 550, 552 defines a hollow cylinder through the ring 500. The portions 550, 552 run substantially parallel to the aperture axis 532 and are oriented at the angle β. The first portion 550 has a first diameter 551 and the second portion 552 has a second diameter 553. The change in diameter of the aperture 518 may be configured to further optimize the air flow as it passes through the aperture 518 and thus impact the fan most efficiently. Further, the length of the two portions 550, 552 may be configured and/or optimized for the most efficient and directed airflow through the aperture 518.

In some alternative embodiments, the aperture may have a constant diameter as it passes through the ring. In other alternative embodiments, the configuration may not be cylindrical about the aperture axis, but may be spiral, or any other configuration, that is designed to optimize the airflow out of the aperture and direct the flow toward the fan.

Advantageously, embodiments of the invention provide an improved air cycle machine cooling flow path that enables energy recovery. Embodiments of the invention enable the recovery of waste stream energy, i.e., energy that is a result of air flow from a cooling airflow path in the air cycle machine. In some configurations, the airflow from the cooling flow of the air cycle machine may be about three percent of the total inflow that is directed toward a fan. Thus, in some embodiments of the invention, energy recovery of this flow is enabled, thereby increasing the efficiency of the system as a whole.

Further, advantageously, embodiments of the invention enable optimization of airflow as it is directed toward a fan of an air cycle machine, and thus augment the air already directed at the fan, thereby reducing the total energy required by the system.

While the invention has been described in detail in connection with only a limited number of embodiments, it should be readily understood that the invention is not limited to such disclosed embodiments. Rather, the invention can be modified to incorporate any number of variations, alterations, substitutions, combination, sub-combination, or equivalent arrangements not heretofore described, but which are commensurate with the spirit and scope of the invention. Additionally, while various embodiments of the invention have been described, it is to be understood that aspects of the invention may include only some of the described embodiments.

For example, the various angles described herein may be any angles that are configured to optimally direct the flow of air as it passes through the apertures. Further, the shape, size, dimensions, position, quantity, etc. of the apertures may be varied depending on the needs of the system, and to most appropriately optimize the air flow through the apertures and toward the fan.

Accordingly, the invention is not to be seen as limited by the foregoing description, but is only limited by the scope of the appended claims.

What is claimed is:

1. An air cycle machine comprising:
a housing configured to enable airflow therethrough;
a fan having a plurality of fan blades disposed within the housing and configured to rotate within the housing and interact with airflow within the housing; and
a removable ring forming a portion of the housing, the removable ring defining a nozzle and having at least one aperture formed therein configured to allow airflow through the at least one aperture from a cooling airflow path of the air cycle machine and into the housing through a wall of the housing,
wherein the at least one aperture is angled relative to the removeable ring to direct an airflow passing therethrough toward the fan such that the air through the at least one aperture augments the airflow within the housing and impacts the fan blades.

2. The air cycle machine of claim 1, wherein the at least one aperture includes a first portion and a second portion.

3. The air cycle machine of claim 2, wherein the first portion defines a first diameter and the second portion defines a second diameter that is different from the first diameter.

4. The air cycle machine of claim 1, wherein the at least one aperture defines an aperture axis passing therethrough and the removable ring defines a central axis, and wherein the aperture axis is not parallel to the central axis.

5. The air cycle machine of claim 1, wherein the at least one aperture defines an aperture axis passing therethrough, and wherein the aperture axis is skew to an angle perpendicular to a surface of the removable ring through which the aperture passes.

6. A method of manufacturing an air cycle machine, the method comprising:
installing a removable ring into a housing of an air cycle machine, the removable ring having at least one aperture formed therein and configured to allow airflow through the at least one aperture from a cooling airflow path of the air cycle machine and into the housing through a wall of the housing,
installing a fan within the housing, wherein the fan is configured to rotate within the housing and downstream of a flow through the at least one aperture;
wherein the at least one aperture is installed angled relative to the removable ring to direct airflow passing therethrough toward the fan such that the air through the at least one aperture augments the airflow within the housing and impacts the fan blades.

7. The method of claim 6, wherein forming the at least one aperture comprises at least one of drilling and machining the at least one aperture in the removable ring.

8. The method of claim 6, wherein the at least one aperture includes a first portion and a second portion.

9. The method of claim 8, wherein the first portion defines a first diameter and the second portion defines a second diameter, wherein the first diameter is different from the second diameter.

10. The method of claim 6, wherein the at least one aperture defines an aperture axis passing therethrough and the removable ring defines a central axis, and wherein the aperture axis is not parallel to the central axis.

11. The method of claim 6, wherein the at least one aperture defines an aperture axis passing therethrough, and wherein the aperture axis is skew to an angle perpendicular to a surface of the removable ring through which the aperture passes.

12. The method of claim 8, wherein each of the first portion and the second portion define a hollow cylinder that form the at least one aperture.

13. The air cycle machine of claim 2, wherein each of the first portion and the second portion define a hollow cylinder that form the at least one aperture.

\* \* \* \* \*